United States Patent [19]
Greven

[11] 3,853,838
[45] Dec. 10, 1974

[54] SEDATIVE PEPTIDES RELATED TO ACTH CONTAINING A D-PHE MOIETY

[75] Inventor: Hendrik Marie Greven, Heesch, Netherlands

[73] Assignee: Akzona Incorporated, Asheville, N.C.

[22] Filed: July 10, 1973

[21] Appl. No.: 377,978

[30] Foreign Application Priority Data
July 15, 1972   Netherlands.................... 7209839

[52] U.S. Cl................. 260/112.5, 424/177, 424/179
[51] Int. Cl... C07c 103/52, A61k 27/00, A61k 17/06
[58] Field of Search .......... 260/112.5; 424/177, 179

[56] References Cited
UNITED STATES PATENTS
| | | | |
|---|---|---|---|
| 3,228,927 | 1/1966 | Kappeler et al. ............. | 260/112.5 |
| 3,479,333 | 11/1969 | Greven ............................ | 260/112.5 |
| 3,632,743 | 1/1972 | Geller et al. ................... | 260/112.5 |

Primary Examiner—Lewis Gotts
Assistant Examiner—Reginald J. Suyat
Attorney, Agent, or Firm—Francis W. Young; Philip M. Pippenger; Hugo E. Weisberger

[57] ABSTRACT

The invention relates to novel peptides and peptide derivatives of the general formula:

A—L—Glu(Q)—L—His—D—X, in which L and D indicate the configuration of the relative residue, A stands for: H—L—Met, H—L—Met($\rightarrow$ O), H—L—Met($\rightarrow$ O$_2$), Dam, Dam($\rightarrow$ O), Dam($\rightarrow$ O$_2$) or the moiety H—L—NH—B—CO—, in which B is a branched or unbranched alkylene group with 1–6 carbon atoms, Q respresents the group OH or NH$_2$, and X is selected from a (N-phenyl branched alkyl) amino group with the general formula

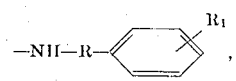

(in which R represents a branched alkylene group with 2–6 carbon atoms and R$_1$ hydrogen, hydroxy, halogen or an alkyl or alkoxy (1–4 C) group), and the group —Phe—Y, in which Y represents a hydroxy group, a (N-aminoalkyl)amino moiety (in which the alkyl group may contain 2–6 carbon atoms) or the group L—Lys—Z or L—Arg—Z, in which Z stands for a hydroxyl group, the group L—Phe—OH, a (N-$\beta$-indolylalkyl)amino moiety or a (N-phenylalky) amino moiety, the alkyl group of both moieties containing 1–6 carbon atoms, as well as the functional derivatives thereof.

The above peptides and peptide derivatives accelerate the extinction of a condition avoidance response; that means that they can be used as sedative agents.

7 Claims, No Drawings

SEDATIVE PEPTIDES RELATED TO ACTH CONTAINING A D-PHE MOIETY

The present invention relates to peptides and peptide derivatives with psychopharmacological properties, in particular sedative properties.

From the Dutch Pat. application No. 70,10,052 it appears that the peptides D—Phe⁷—(4—10) ACTH and D—Phe⁷—(4-9) ACTH accelerate the extinction of a conditioned avoidance response. This property of the said D—Phe peptides presents a violent contrast to that of other (L—Phe)ACTH peptide fragments which are known to inhibit the extinction of a conditioned avoidance response.

Up to now it has been assumed that the amino acid sequence (4-9)ACTH with the amino acid residue phenylalanyl in the D-configuration was essential for exerting an acceleration of the extinction of avoidance response.

Surprisingly it has, however, been found that the sequence D—Phe⁷—(4-9)ACTH is certainly not the key sequence for the said activity, but a much smaller peptide having the sequence D—Phe⁷—(4-7)ACTH on the understanding that both at the N-terminal as well as at the C-terminal side of that (key) peptide certain modifications can be introduced without affecting the activity of the peptide.

The present invention therefore comprises peptides and peptide derivatives of the general formula:

A—L—Glu(Q)—L—His—D—X   1 in which
L and D indicate the configuration of the relative residue,
A stands for H—L—Met, H—L—Met( → O), H—L—Met( → O₂), Dam, Dam( → O), Dam-( → O₂) or the amino acid moiety H—L—N-H—B—CO—, in which B represents a branched or unbranched alkylene group with 1-6 carbon atoms, Q represents a hydroxy or amino group, and
X is selected from a N-phenyl branched alkyl)-amino group of the general formula

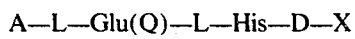

(in which R stands for a branched alkylene group with 2-6 carbon atoms, and R₁ for hydrogen, hydroxy, halogen, or an alkyl or alkoxy (1-4 C) group) and the group —Phe—Y, in which Y represents a hydroxy group, a (N-aminoalkyl)-amino moiety or the group L—Lys—Z or L—Arg—Z, in which Z stands for a hydroxyl group, the group —L—Phe—OH, a (N-β-indolylalkyl)-amino moiety or a (N-phenylalkyl)-amino moiety, as well as functional derivatives thereof.

The definition of "D-X" in the above general formula comprises besides the moiety —D—Phe—Y also a moiety that is substantially distinguished from the D-phenylalanyl residue by the absence of the carboxyl group. By a D-(N-phenyl branched alkyl)-amino group is meant in this connection the D-configuration of a residue of the general formula:

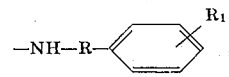

in which R represents a branched alkylene group with 2-6 carbon atoms, and R₁ hydrogen, hydroxy, halogen or a lower alkyl or alkoxy group with 1-4 carbon atoms.

Examples of this resiidue are a D-amphetamide group and a D-α-phenylethylamide group.

By a (N-aminoalkyl)-amino group in the definition of Y is meant a moiety that is mainly distinguished from the arginyl or lysyl residue by the absence of the carboxyl group, viz., a moiety of the formula:

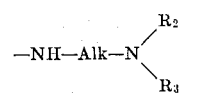

in which Alk represents a branched or unbranched alkylene group with 2-6 carbon atoms, R₂ hydrogen or alkyl (1-4 C), and R₃ hydrogen, alkyl (1-4 C), or an amidine group.

A (N-β-indolylalkyl)-amino moiety in the definition of Z is characterized by the formula:

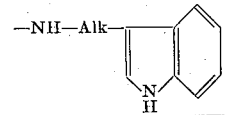

in which Alk represents a branched or unbranched alkylene group with 1-6 carbon atoms. This moiety is substantially distinguished from tryptophan by the absence of the carboxyl group. An example of this moiety is a tryptamide group.

By a (N-phenylalkyl)-amino group in the definition of Z is meant a residue of the general formula:

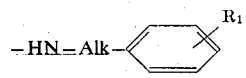

in which Alk represents a branched or unbranched alkylene group with 1-6 carbon atoms, and R₁ hydrogen, halogen, hydroxy, or an alkyl or alkoxy group with 1-4 carbon atoms.

The key peptide D—Phe⁷ —(4-7)ACTH shows an acceleration of the extinction of avoidance response approximately at the same level as the known D—Phe⁷ —(4-9)ACTH peptide. This activity is not affected if the C-terminal D—Phe residue is replaced by a D-(N-phenyl branched alkyl)-amino residue.

The following modifications in the key peptide lead to a significant increase of the acceleration of extinction:

a. Replacement of Met by optically inactive residues, especially the substitution of β-Ala or Dam for L-Met, causes an increase of activity by a factor of about 3, b. Oxidation of the Met or Dam residue to the corresponding sulfoxide or sulfone causes an increase of acitivty by a factor 3–10, c. Extension of the chain length at the C-terminal side by —L—Lys (or L—Arg)—Phe—OH causes an increase of the activity by a factor of about 3, d. Extension of the chain length at the C-terminal side by —L—Lys (or L-Arg)-N-β-indolylalkylamide, especially —L—Lys (or L-Arg)-Tra raises the activity by a factor 3–10.
e. Extension of the chain length at the C-terminal side by an N-aminoalkylamide group or the group —L—Lys (or L-Arg)-N-phenylalkylamide gives an increase of activity by a factor of about 3.

The peptides and peptide derivatives according to the general formula I are prepared by a process commonly used in peptide chemistry. The processes that are employed usually for the manufacture of the present compounds can be summarised as follows:

a. condensation of a compound (amino acid, peptide) having a free carboxyl group and protected other reactive groups with a compound (amino acid, peptide or amine) having a free amino group and protected other reactive groups, in the presence of a condensation agent;
b. condensation of a compound (amino acid, peptide) having an activated carboxyl group and optionally protected other reactive groups, with a compound (amino acid, peptide, amine) having a free amino group and optionally protected other reactive groups;
c. condensation of a compound (amino acid, peptide) having a free carboxyl group and optionally protected other reactive groups with a compound (amino acid, peptide. amine) having an activated amino group and optionally protected other reactive groups, after which the protecting groups are removed, if necessary.

Activation of the carboxyl group can be effected, for example, by converting the carboxyl group into an acid halide, an azide, anhydride imidazolide, or an activated ester such as the N-hydroxy-succinimide ester or the p-nitrophenyl ester.

The amino group can be activated by converting it into a phosphite amide or by the "phosphor-azo" method.

The most conventional methods for the above condensation reactions are: the carbodiimide method, the azide method, the mixed anhydride method and the method of the activated esters, as described in "The Peptides," Vol. I, 1965 (Academic Press), by E. Schröder and K. Lübke. Moreover Merrifield's so-called "Solid Phase" method, described in J. Am. Chem. Soc. 85, 2149 (1963) can be applied for the manufacture of the present peptides and peptide derivatives.

The reactive groups that are not allowed to participate in the condensation reaction are protected effectively by the so-called protecting groups, which can easily be removed again, e.g., by hydrolysis or reduction. For a description of the protecting groups there is referred to the literature on the subject.

It is mostly recommendable to protect also the guanidine group of arginine, the ε-amino group of lysine and the imidazol group of histidine, but his protection is not necessary. Conventional protecting groups in this connection are a tert. -butyloxy-carbonyl or a tosyl group for the ε-amino group of lysine, a nitro group for the guanidine group of arginine and a benzyl, dinitrophenyl or a trityl group for the imidazol group of histidine.

The protecting groups can be split off by various conventional methods, dependent upon the nature of the relative group, for example with trifluoro acetic acid, or by mild reduction, for example with hydrogen and a catalyst such as palladium, or with HBr in glacial acetic acid.

Peptides according to the present invention having as the N-terminal moiety a L-Met( $\rightarrow$ O) or Dam( $\rightarrow$ O) residue may be prepared i.a. from the corresponding L—Met— or Dam-peptide by means of a mild oxidation known per se, for example with dilute hydrogen-peroxide or a peracid. This oxidation yields a mixture of the S- and R-sulfoxide, which mixture can be separated into the separate diastereo-isomers by a method known per se.

By coupling the S- or R-sulfoxide of methionine or desamino-methionine(Dam) with the peptide H—L—Glu(Q)—L—His—D—X, in which Q and X have the meanings previously indicated, the separate enantiomers can also be obtained direct.

The peptides according to the invention having as the N-terminal moiety of L-Met( $\rightarrow$ O$_2$) or Dam( $\rightarrow$ O$_2$) residue may be prepared most conveniently by an oxidation known per se of the corresponding L-Met- or Dam-peptide, for example with H$_2$O$_2$ or a peracid.

By functional derivatives of the peptides according to the general formula I are meant:

1. the pharmaceutically acceptable acid addition salts;
2. peptides according to the general formula I, in which one or more free amino groups have been substituted by an acyl group derived from an aliphatic carboxylic acid with 1–6 carbon atoms, such as an acetyl group;
3. unsubstituted amides or alkyl (1–6 C) substituted amides of those peptides according to formula I having a free carboxyl group;
4. esters of the present peptides derives from aliphatic or araliphatic alcohols with 1–18 carbon atoms, in particular the lower (1–6 C) aliphatic alcohols, such as methanol, ethanol, butanol, or cyclohexanol, and the lower araliphatic (7–10 C) alcohols such as benzylalcohol, phenylethylalcohol or cinnamylalcohol;
5. metal complexes formed by contacting the peptides or the derivatives thereof with a sparingly soluble salt, hydroxide or oxide of a metal, preferably zinc, or preparations obtained by associating the relative peptides with organic, mostly polymeric, compounds such as gelatine, polyphloretinphosphate or polyglutamic acid.

The acid addition salts are obtained by reacting the present peptides with a pharmaceutically acceptable organic or inorganic acid such as HCl, phosphoric acid, acetic acid, maleic acid, tartaric acid and citric acid.

The peptides according to the invention and the derivatives defined above may be administered parenterally, orally, sublingually, rectally or intranasally. Preferably the peptides are placed in a form suitable for parenteral administration, for which purpose they are dissolved, suspended or emulgated in a suitable liquid. However, mixed with suitable auxiliaries and/or fillers, they can also be placed in a form suitable for oral, sublingual, rectal or intranasal administration.

The peptides or peptide derivatives according to the invention are preferably administered parenterally in a daily dosage of from 1 $\mu$g to 1 mg per kg bodyweight, dependent upon the peptid's activity level. For oral, sublingual, rectal or intranasal administration the daily dosage may be considerably higher, preferably from 0.1 mg to 100 mg per kg/bodyweight.

Exceedingly valuable preparations are obtained if the present peptides are placed into a form in which they have prolonged activity, e.g., incorporated into gelatin, polyphloretinphosphate or polyglutamic acid, or preferably as metalcomplexes. These metal complexes can be obtained by contacting the peptides with poorly soluble metal salts, metal hydroxides or metal oxides. As poorly soluble metal salts the metal phosphates, metal pyrophosphates and metal polyphosphates are commonly used. Metals that can be used in this process are the metals belonging to the b-groups of the periodic system, for example cobalt, nickel, copper, iron, and preferably zinc, as well as the metals belonging to the main groups of the periodic system and capable of forming complexes, such as magnesium and aluminum. The preparation of the said metal complexes takes place in a conventional manner.

As already stated previously the compounds according to the invention have valuable psychopharmacological activities. They accelerate the extinction of a conditioned avoidance response; that means that they may be used in general as sedative or tranquillizing agents. More particularly they can be used for the treatment of mental disorders whereby an acceleration of the extinction is desired, for example in certain types of neurosis.

The psychopharmacological activity of the present peptides was measured in the so-called "Shuttle box" test and in the "Pole jumping" test. Both tests gave the same result as regards the accelerated extinction of the conditioned avoidance response.

With regard to the various abbreviations used throughout the specification, examples and claims, the following is to remark:

I. If no optical configuration has been stated the L-form is meant.

II. The following abbreviations have been used for the protecting or activating groups:

| | |
|---|---|
| Z | = benzyloxycarbonyl |
| Boc | = tert-butyloxycarbonyl |
| tBu | = tert.-butyl |
| Me | = methyl |
| ONP | = p-nitrophenyloxy |
| Bzl | = benzyl |

III. For the solvents or reagents the following abbreviations have been used:

| | |
|---|---|
| Bz | = benzene |
| To | = toluene |
| EtOH | = ethanol |
| Bu | = butanol |
| Py | = pyridine |
| Ac or HAc | = acetic acid |
| Am | = amylalcohol |
| iPro | = isopropanol |
| DMF | = dimethylformamide |
| THF | = tetrahydrofuran |
| TAA | = tri-ethylamine |
| TFA | = trifluoro acetic acid |
| Wa | = water |
| DCCI | = dicyclohexyl carbodimide |
| DCHU | = dicyclohexyl ureum |

IV. For the amino acid residues the following abbreviations have been used:

| | |
|---|---|
| Met | = methionyl |
| Met($\rightarrow$O) | = sulfoxide of methionyl |
| Met($\rightarrow$O$_2$) | = sulfone of methionyl |
| Glu(Q) or Glu | = glutamyl (Q = OH) |
| Glu(Q) or Gln | = glutaminyl (Q = NH$_2$) |
| His | = histidyl |
| Phe | = phenylalanyl |
| Arg | = arginyl |
| Lys | = lysyl |
| Gly | = glycyl |
| Val | = valyl |
| Ala | = alanyl |
| $\beta$-Ala | = $\beta$-alanyl |
| ($\alpha$-Me)Ala | = $\alpha$-methylalanyl |

V Abbreviations used for other residues:

| | |
|---|---|
| Dam | = desamino-methionyl (or $\gamma$-methylthio-butyryl) |
| Dam($\rightarrow$O) | = desamino-methionyl sulfoxide |
| Dam($\rightarrow$O$_2$) | = desamino-methionyl sulfone |
| PPA | = N-phenylpropyl)amino |
| PEA | = (N-$\beta$-phenylethyl)amino |
| Amf | = (N-1-phenylisopropyl)amino, (derived from amfetamine) |
| Tra | = (N-$\beta$-indolylethyl)amino, (derived from tryptamine) |

Preparation starting substances
A. Preparation Boc—Met—Glu(OtBu)—His—N$_2$H$_3$
 1. Boc—Met—Glu(OtBu)—His—OMe Boc—Met—N$_2$H$_3$ (10.52 g), dissolved in 75 ml of DMF is cooled down to 0°C, after which 23.6 ml of 3.4 N HCl in THF are added, and at −20°C 5.85 ml (43.3 mmol) of isoamyl nitrite. The mixture is stirred for 7 minutes at −20°C and then added to a solution of 17.05 g of H—Glu(OtBu)—His—OMe.2 HCl in 50 ml of dimethylformamide. Then enough triethylamine to adjust the final pH of the mixture to 6.9. The mixture is stirred for 3 days at 0°C, after which the triethylamine.HCl formed is filtered off, and the filtrate evaporated to dryness. The residue is dissolved in 150 ml of ethylacetate/water. The water layer is separated and the ethylacetate layer washed twice with water. Then the water layers are combined and extracted again with ethylacetate (2 × 25 ml). The ethylacetate layers are dried, after which the solution is evaporated to about 100 ml and set aside at 0°C.

Melting point: 138°–142°C.

Rf in Bu:Ac:Wa (4:1:1) = 0.59 on SiO$_2$.

2. Boc—Met—Glu(OtBu)—His—N$_2$H$_3$

Of the above methyl ester (3.7 g) are dissolved in 70 ml of methanol, after which 3.7 ml of hydrazine hydrate are added. The mixture is stirred for 5 hours at room temperature. The solution is evaporated to dryness and the residue then stirred with water and dried.

Rf in Am:Ipro:Wa (10:4:5) = 0.39 on SiO$_2$.

B. Preparation Boc—Val—Glu(OtBu)—His—N$_2$H$_3$
 1. Boc—Val—Glu(OtBu)—His—OMe

Boc—Val—OH (3.26 g; 15 mmol) is dissolved in 20 ml of methylene chloride, after which 1.73 g of N-hydroxy-succinimide are added. The mixture is cooled down to −20°C, after which 3.09 g of DCCI, dissolved in 20 ml of cooled methylene chloride, are added. The resulting solution is stirred for 1 hour at −20°C and then for 20 hours at +20°C.

After filtration of the resulting DCHU, the filtrate is evaporated to dryness and the residue dissolved in 30 ml of DMF, after which 7.33 g of Z—Glu(Ot- Bu)—His—OMe (prepared according to Kappler Helv. 44, 1991, 1961) and 1.4 g of 10% palladium on charcoal are added. Hydrogen is bubbled through the mixture for 5 hours, after which the mixture is stirred for 1 night, filtered and the filtrate evaporated to dryness.

The residue is dissolved in aqueous ethylacetate and the solution washed with water, sodium bicarbonate and water. The organic phase is dried, after which the ethylacetate is evaporated off in vacuo. The residue is recrystallized from ethylacetate/ether.
Yield 3.95 g. Melting point: 117°–119°C.
Rf in Bz:EtOH (8:2) = 0.55 on $SiO_2$.

2. Boc—Val—Glu(OtBu)—His—$N_2H_3$

Of the above methyl ester 3.73 g are dissolved in 85 ml of methanol, after which 3.72 g of hydrazine hydrate are added. The mixture is stirred for 7 hours at room temperature, after which the solution is evaporated to dryness and the residue triturated with ether.
Rf in Am:iPro:Wa (10:4:5) = 0.33 on $SiO_2$.

C. Preparation Boc—β—Ale—Glu(OtBu)—His—$N_2H_3$

1. Boc—β—Ala—Glu(OtBu)—His—OMe

In the same manner as described in B.1 Boc—β—Ala—Glu(OtBu)—His—OMe is prepared by coupling Boc—β—Ala—OH with H—Glu(OtBu)—His—OMe.
Melting point: 93°–95°C.
Rf in Bz:EtOH (8:2) = 0.25 on $SiO_2$.

2. Boc—β—Ala—Glu(OtBu)—His—$N_2H_3$

By condensing the substance obtained in (1) with hydrazine hydrate as described in B.2 the peptide Boc—β—Ala—Glu(OtBu)—His—$N_2H_3$ is obtained.
Rf in Am:iPro:Wa (10:4:5) = 0.42 on $SiO_2$.

D. Preparation Boc—Gly-Glu(OtBu)—His—$N_2H_3$

1. Boc—Gly—Glu(OtBu)—His—OMe

In the same manner as described in B.1 Boc—Gly—Glu(OtBu)His—OMe is prepared by reacting Boc—Gly—OH with H—Glu(OtBu)—His—OMe.
Melting point: 103°–108°C.
Rf in Bz:EtOH (8:2) = 0.43 on $SiO_2$.

2. Boc—Gly—Glu(OtBu)—His—$N_2H_3$

By reacting this substance with hydrazine hydrate as described in A.2 the Boc—Gly—Glu(OtBu)—His—$N_2H_3$ is prepared.
Rf in Am:iPro:Wa (10:4:5) = 0.32 on $SiO_2$.

E. In the same way are also prepared:
1. Boc—Ala—Glu(OtBu)—His—$N_2H_3$
Rf = 0.33 (Am:iPro:Wa = 10:4:5).
2. Boc—(α—Me)Ala—Glu(OtBu)—His—$N_2H_3$
Rf = 0.31 (Am:iPro:Wa = 10:4:5).
3. Dam—Glu(OtBu)—His—$N_2H_3$
Rf = 0.52 (Bu:Ac:Wa = 4:1:1).
4. Boc—Met—Gln—His—$N_2H_3$
Rf = 0.28 (Am:iPro:Wa = 10:4:5).

EXAMPLE I

H—Met—Glu—His—D—Phe—OH

1. Boc—Met—Glu(OtBu)—His—D—Phe—OtBu

To 2.34 g of Boc—Met—Glu(OtBu—His—$N_2H_3$, dissolved in 25 ml of DMF are added, after cooling the solution to 0°C, 2.3 ml of 5.2 N HCl/THF and, after cooling to −20°C, 0.54 ml of isoamyl nitrite. After 20 minutes stirring at −20°C 1.7 ml of triethylamine and a solution of 0.86 g of H—D—Phe—OtBu in 20 ml of DMF are added, after which the pH is adjusted to 6.8.

After 70 hours stirring at 0°C the reaction mixture is filtered and the filtrate evaporated to dryness.

The residue is dissolved in ethylacetate/water and washed twice with water. The organic phase is dried and then evaporated. The residue is crystallized from ethylacetate/petroleum ether.
Yield: 2.44 g (80%).
Rf in Bu:Py:Ac:Wa (4:3/4:1/4:1) = 0.91 on $SiO_2$.

2. Removal of protecting groups

One gram of the tetrapeptide (1.) is dissolved in 10 ml of 90% trifluoro acetic acid. The resulting solution is left to stand for 30 minutes at 20°C and then added dropwise to 100 ml peroxide-free ether.

The resulting precipitate is dried over KOH, dissolved in 25 ml of t-butanol/water (1:1) and stirred with Dowex X-8 in the acetate form. After filtration the filtrate is lyophilised.
Yield: 0.6 g of the acetate.
Rf in Bu:Py:Ac:Wa (2:3/4:1/4:1) = 0.32 on $SiO_2$.

3. In the same way as described in (1.) and (2.) the following peptide-acetates are prepared starting from Boc—Met—Glu(OtBu)—His—$N_2H_3$ and H—D—Phe—$OC_{11}H_{23}$, H—D—Phe—OMe or D—amphetamine:

| | |
|---|---|
| H—Met—Glu—His—D—Phe—$OC_{11}H_{23}$ | Rf* 0.45 |
| H—Met—Glu—His—D—Phe—OMe | Rf* 0.39 |
| H—Met—Glu—His—D—Amf | Rf**0.30 |

*Rf in Bu:Py:Ac:Wa (2:3/4:1/4:1)
** Rf in Bu:Py:Ac:Wa (4:3/4:1/4:1).

EXAMPLE II a. Oxidation of H—Met—Glu—His—D—Phe—OH to the corresponding sulfoxide Of the tetrapeptide prepared in example I.2 0.06 mmol is dissolved in 2.5 ml of acetic acid, after which 15 μl of 30% hydrogen peroxide are added. After 1 hours stirrage at 20°C a suspension of 20 mg of platinum black in 2.5 ml of glacial acetic acid is added, after which the mixture is stirred for another 30 minutes.

After filtration the filtrate is evaporated in vacuum. The residue is dissolved in 10 ml of t-butanol/water (1:1) and lyophilized, after which the resulting sulfoxide is stored over $P_2O_5$.
Rf in Bu:Py:Ac:Wa (4:3/4:1/4:1) = 0.22 on $SiO_2$.

b. Oxidation of H—Met—Glu—His—D—Phe—OH to the corresponding sulfone

Of the tetrapeptide prepared in example I.2 0.2 mmol is dissolved in a mixture of 0.5 ml of water, 0.1 ml of 4N perchloric acid and 0.02 ml of 0.5M ammonium molybdate, after which 0.06 ml of 30% hydrogen peroxide is added. The mixture is stirred for 3 hours at 20°C, after which 20 ml of t-butanol/water are added and Dowex X-8 in the acetate form. The mixture is stirred for 1 hour and then filtered. The filtrate is lyophilized.
Rf in Bu:Py:Ac:Wa (4:3/4:1/4:1) = 0.23 on $SiO_2$.

EXAMPLE III

H—Met—Glu—His—D—Phe—Lys—OH

1. Boc—Met—Glu(OtBu)—His—D—Phe—Lys(Boc)—OH

Boc—Met—Glu(OtBu)—His—$N_2H_3$ (1.17 g) is converted into the corresponding azide in the way described in example I.1. After the addition of 0.9 g of H—D—Phe—Lys(Boc)—OH (Rf in Bu:Py:Ac:Wa (4:3/4:1/4:1) = 0.30 on SiO₂) the pH is adjusted to 7.1 with triethylamine and the reaction mixture set aside at 0°C.

The reaction mixture is left to stand for 70 hours and then filtered, the filtrate evaporated in vacuo and the residue taken up in aqueous ethylacetate. The organic phase is washed with saliferous water, dried and distilled off in vacuo. The residue is dissolved in ethylacetate and diluted with petroleum ether. The resulting precipitate is filtered off.

Yield: 0.7 g.

Rf in To:EtOH (8:2) = 0.25 on SiO₂.

2. H—Met—Glu—His—D—Phe—Lys—OH

The protecting groups of the product obtained in (1.) are removed in the way described before (example I.2) after which the product is converted into the acetate yielding the pentapeptide acetate. Yield: 0.4 g.

Rf in Bu:Py:Ac:Wa (4:3/4:1/4:1) = 0.17 on SiO₂.

EXAMPLE IV

A—Glu—His—Phe—OH or A—Gln—His—D—Phe—OH

1. Boc—Ala—Glu(OtBu)—His—D—Phe—OtBu

Starting from 1.05 g (2 mmol) Boc—Ala—Glu(OtBu)—His—N₂H₃ the azide is prepared in the conventional manner (example I.1). The azide is added to 0.44 g of H—D—Phe—OtBu, after which the pH is adjusted to 6.9 with triethylamine.

The reaction mixture is stirred for 70 hours and then processed in the way described in example I.1.

Yield: 0.93 g.

Rf in Bu:Py:Ac:Wa (4:3/4:1/4:1) = 0.90 on SiO₂.

2. In the same way are prepared starting from the relative hydrazine:

Boc—Val—Glu(OtBu)—His—D—Phe—OtBu
Boc—β—Ala—Glu(OtBu)—His—D—Phe—OtBu
Dam—Glu(OtBu)—His—D—Phe—OtBu
Boc—Met—Gln—His—D—Phe—OtBu.

3. Removal of protecting groups

In the same way as described for the Met-analogue (example I.2) the tetrapeptide analogues prepared in 1. and 2. are deprotected, resulting into the acetates of the following peptides:

| | |
|---|---|
| H—Val—Glu—His—D—Phe—OH | Rf* = 0.24 on SiO₂ |
| H—Ala—Glu—His—D—Phe—OH | Rf* = 0.22 on SiO₂ |
| H—β—Ala—Glu—His—D—Phe—OH | Rf* = 0.21 on SiO₂ |
| Dam—Glu—His—D—Phe—OH | Rf* = 0.31 on SiO₂ |
| H—Met—Gln—His—D—Phe—OH | Rf* = 0.29 on SiO₂ |

*Rf system: Bu:Py:Ac:Wa (4:3/4:1/4:1).

EXAMPLE V

A—Glu—His—D—Phe—Lys—OH.acetate

1. Boc—β—Ala—Glu(OtBu)—His—D—Phe—Lys(Boc)—OH

Boc—β—Ala—Glu(OtBu)—His—N₂H₃ (1.05 g) is converted in the manner described in example I.1 into the azide.

The azide is added to a cooled solutuion of H—D—Phe—Lys—(Boc)—OH (see example III.1), after which the pH of the reaction mixture is adjusted to 7.0 with triethylamine. The reaction mixture is stirred for 74 hours at 0°, after which it is processed further in the way described in example III.1.

Rf in Bu:Py:Ac:Wa (4:3/4:1/4:1) = 0.87 (SiO₂).

Yield: 0.85 g.

2. Removal of protecting groups

The pentapeptide (0.5 g) obtained in (1.) is dissolved in trifluoro acetic acid as described previously (example I.2). The trifluoro acetic acid-salt obtained is dissolved in t-butanol water and treated with Dowex X-8 (acetate). The resulting filtrate is lyophilised. Yield: 0.35 g. Rf in Bu:Py:Ac:Wa (4:3/4:1/4:1) = 0.17 on SiO₂.

3. In the same way are prepared the acetates of:

| | |
|---|---|
| Dam-Glu-His-D-Phe-Lys-OH | Rf = 0.29 |
| H-Gly-Glu-His-D-Phe-Lys-OH | RF = 0.19 |
| H-Val-Glu-His-D-Phe-Lys-OH | RF = 0.20 |
| H-(α-Me)Ala-Glu-His-D-Phe-Lys-OH | Rf = 0.18 |

Rf in Bu:Py:Ac:Wa (4:3/4:1/4:1) on SiO₂.

EXAMPLE VI

A—Glu—His—D—Phe—Arg—OH

1. H—D—Phe—Arg—OH acetate

A solution of 12.8 g of H—Arg(NO₂)—OMe.HCl in 200 ml of DMF is cooled down to 4°C after which 4.8 g of TAA are added. The resulting TAA.hydrochloride is filtered off, after which 20 g of Z—D—Phe—ONP are added.

After 4 days stirring at 20°C, 100 ml of DMF are distilled off in vacuo and the residue is diluted with 600 ml of ethylacetate.

The organic phase is washed with citric acid (5%), ammonium-hydroxide and water, and after that dried. Then the solvent is evaporated. The light yellow residue is recrystallized from ethylacetate/petroleum ether.

Yield: 24 g. Melting point: 90°–92°c.

Rf in To:EtOH (8:2) = 0.58 on SiO₂.

Twenty grams of this ester are dissolved in dioxane and then saponified with 1.1 equiv. sodiumhydroxide for 2 hours while stirring. After being acidified to pH 2, the dioxane is diluted with a tenfold quantity of water to precipitate the dipeptide.

The resulting precipitate is stirred for 3 hours at 0° and then filtered off.

Yield: 14 grams.

Rf in To:EtOH (8:2) = 0.09 on SiO₂.

Ten grams of this dipeptide acid are dissolved in 200 ml of 90% acetic acid, after which 1 g of 10% palladium on charcoal is added. Hydrogen is bubbled through the mixture for 2 days. After filtration of the catalyst, the filtrate is evaporated to dryness, yielding 2 g of H—D—Phe—Arg—OH.acetate.

Rf in Bu:Py-Ac:Wa (4:3/4:1/4:1) = 0.20 on SiO₂.

2. Boc—Met—Glu(OtBu)—His—D—Phe—Arg—OH

To Boc—Met—Glu(OtBu)—His—N₃ prepared in the conventional manner (example I.1) 4 mmol H—D—Phe—Arg—OH acetate (1) are added, after which the pH is adjusted to 7.1 with triethylamine. The mixture is stirred for 70 hours at 0°C and then filtered.

The filtrate is evaporated.

The residue is stirred with ethyl acetate and filtered. Then the residue is taken up in DMF and added dropwise to dry ethylacetate. The mixture is stirred for 2 hours at 20°C, after which the amorphous precipitate is filtered off, yield 60%.

Rf in Bz:EtOH (8:2) = 0.15 on SiO₂.

3. In the same way are prepared:

Boc—β—Ala—Glu(OtBu)—His—D—Phe—Arg—OH

Boc(α—Me)Ala—Glu(OtBu)—His—D—Phe—Arg—Oh
Boc—Gly—Glu(OtBu)—His—D—Phe—Arg—OH
Dam—Glu(OtBu)—His—D—Phe—Arg—Oh

4. Removal of protecting groups

The elimination is performed in a conventional manner (see example I.2).

The acetates of the following peptides are obtained in 60–65% yield:

| | |
|---|---|
| H-β-Ala-Glu-His-D-Phe-Arg-OH | Rf* 0.13 |
| H-Met-Glu-His-D-Phe-Arg-OH | Rf* 0.18 |
| H-(α-Me)Ala-Glu-His-D-Phe-Arg-OH | Rf* 0.16 |
| H-Gly-Glu-His-D-Phe-Arg-OH | RF* 0.13 |
| Dam-Glu-His-D-Phe-Arg-OH | Rf* 0.25 |

*Rf in Bu:Py:Ac:Wa (4:3/4:1/4:1) on SiO$_2$.

EXAMPLE VII

A—Glu—His—D—Phe—NH(CH$_2$)$_5$—NH$_2$

1. H—D—Phe—NH(CH$_2$)$_5$—NHBoc

Z—D—Phe—ONP (9.24 g) is dissolved in 40 ml of DMF. After the addition of 4.77 g of HCl salt of Boc—NH(CH$_2$)$_5$—NH$_2$ in 60 ml of DMF and 2.88 ml of TAA. the mixture is stirred for 20 hours at 20°C.

After removal of the resulting precipitate by filtration, the filtrate is evaporated to dryness.

The oily residue crystallizes from dry ethylacetate.

Yield after filtration of the precipitate: 90% (8.66 G). Rf in To:EtOH (8:2) = 0.80 on SiO$_2$.

4.8 g of this protected amino acid-amide are dissolved in 100 ml of dry methanol. After the addition of 0.9 g of 10% palladium on charcoal, hydrogen is bubbled through the mixture for 2.5 hours, after which the mixture is filtered. The filtrate is evaporated to dryness.

Rf in Bu:Ac:Wa (4:1:5) = 0.25 on SiO$_2$.

2. Boc—Met—Glu(OtBu)—His—D—Phe—NH—(CH$_2$)$_5$—NH—Boc

To the azide prepared from Boc—Met—Glu(OtBu)—His—N$_2$H$_3$ according to example I.1 (5.85 g) are added 3.47 g of the derivative prepared in 1. and 3.76 ml of N-ethylmorpholine.

The pH is adjusted to 7.0, after which the mixture is stirred for 70 hours at 0°C.

The resulting precipitate is filtered off, after which the filtrate is evaporated in vacuo. The residue obtained is taken up in aqueous ethylacetate, after which it is washed with water. Then the organic phase is dried and evaporated. The residue is crystallized from petroleum ether.

Rf in Bu:Py-Ac:Wa (4:3/4:1/4:1) = 0.76 on SiO$_2$.

3. Starting from the corresponding hydrazines the following peptides are prepared in the same way:

Boc—Val—Glu(OtBu)—His—D—Phe—NH—(CH$_2$)$_5$—NH—Boc
Boc—Ala—Glu(OtBu)—His—D—Phe—NH—(CH$_2$)$_5$—NH—Boc
Boc—β-Ala—Glu(OtBu)—His—D—Phe—NH—(CH$_2$)$_5$—NH—Boc

4. Removal of protecting groups

The peptides prepared in 2. and 3. are treated in the way as described in example I.2 to obtain the acetates of the following peptides:

| | |
|---|---|
| H-Met-Glu-D-Phe-NH-(CH$_2$)$_5$-NH$_2$ | Rf* = 0.24 (SiO$_2$) |
| H-Ala-Glu-D-Phe-NH-(CH$_2$)$_5$-NH$_2$ | RF* = 0.20 (SiO$_2$) |
| H-Val-Glu-His-D-Phe-NH-(CH$_2$)$_5$-NH$_2$ | Rf* = 0.23 (SiO$_2$) |
| H-β-Ala-Glu-His-D-PHe-NH-(CH$_2$)$_5$-NH$_2$ | Rf* = 0.19 (SiO$_2$) |

*Rf system: Bu:Py:Ac:Wa (4:3/4:1/4:1).

EXAMPLE VIII

A—Glu—His—D—Phe—Lys—Phe—OH and derivatives

1. Z—D—Phe—Lys(Boc)—Phe—OBzl

H—Lys(Boc)—Phe—OBzl (9.68 g) is dissolved in 50 ml of DMF, after which 9.6 g of Z—D—Phe—ONP (22.8 mmol) are added. The mixture is stirred for 24 hours at 20°C, after which the solvent is distilled off in vacuo and the residue taken up in ethylacetate.

The phase is washed successively with 0.1 N HCl, water, 5% sodium bicarbonate solution, water and then dried and evaporated in vacuo.

The resulting residue is recrystallized from ethylacetate/petroleum ether.

Rf in Bz:EtOH (8:2) = 0.70 on SiO$_2$.

2. Z—D—Phe—Lys(Boc)—Phe—OMe

H—Lys(Boc)—Phe—OMe (4.24 g) is dissolved in 25 ml of DMF, after which 4.77 g of Z—D—Phe—ONP are added. The mixture is processed further as described in 1.

Rf in Bz:EtOH (8:2) = 0.75 on SiO$_2$.

3. Z—D—Phe—Lys(Boc)—Phe—NH$_2$

Of the ester obtained in 2. 500 mg are dissolved in methanol. The solution is cooled down to 0°C, after which the solution is saturated with ammonia. After 24 hours stirring the resulting precipitate is filtered off and immediately processed further.

4. Z—D—Phe—Lys(Boc)—Phe—OC$_{11}$H$_{23}$

Three grams of Z—D—Phe—Lys(Boc)—Phe—OH, obtained by saponification of the ester from (1.), are dissolved in 45 ml of DMF, after which 1.1 equiv. of undecylbromide and 1.1 equiv. of dicyclo-hexylamine are added. The mixture is stirred for 2 days at room temperature, after which the suspension is cooled down to 0°C. After that the precipitate is filtered off. The filtrate is evaporated to dryness and the residue taken up in aqueous ethylacetate The organic phase is washed successively with 0.1 N HCl, water, 5% sodium bicarbonate solution and water, after which the ethylacetate layer is dried and distilled off in vacuo. The residue is immediately used for further conversions.

5. Removal of Z-protecting group

Five grams of the tripeptide derivative, obtained in (1), (2), (3) or (4.) are dissolved in 50 ml of methanol, after which 0.5 g of 10% palladium on charcoal is added. For 4 hours hydrogen is bubbled through the mixture, after which the catalyst is filtered off. The filtrate is evaporated and the residue immediately processed further. In this manner the following peptide derivatives are obtained:

| Peptide | Rf in To:EtOH (8:2) |
|---|---|
| H-D-Phe-Lys(Boc)-Phe-OH | 0.23 |
| H-D-Phe-Lys(Boc)-Phe-OMe | 0.37 |
| H-D-Phe-Lys(Boc)-Phe-NH$_2$ | 0.26 |
| H-D-Phe-Lys(Boc)-Phe-OC$_{11}$H$_{23}$ | 0.41 |

6. Boc—(α—Me)Ala—Glu(OtBu)—His—D—Phe—Lys(Boc)—Phe—OH

Boc—(α-Me)Ala—Glu(OtBu)—His—N$_2$H$_3$ (0.96 g) is converted into the azide with 3 ml of 1 N HCl/THF and 0.13 ml of isoamyl nitrite, in the conventional manner. This azide is added to the solution of 1 mmol of H—D—Phe—Lys(Boc)—Phe—OH in 10 ml of cooled DMF, after which the pH is adjusted to 6.9 with N-ethylmorpholine.

The mixture is left to stand for 70 hours at 0°, after which the precipitate is filtered off and the DMF solution (the filtrate) is added dropwise to a 10-fold quantity of water. The resulting precipitate is filtered off after 2 hours stirring.

Yield: 1.2 g.

Rf in Bu:Py:Ac:Wa (4:3/4:1/4:1) = 0.53 on SiO$_2$.

7. In the same manner as described in 6. the following protected peptides are obtained:

Boc—Gly—Glu(OtBu)—His—D—Phe—Lys(Boc-)—Phe—OH

Boc—Met—Gly(OtBu)—His—D—Phe—Lys(Boc-)—Phe—OH

Dam—Glu(OtBu)—His—D—Phe—LYs(Boc)—Phe—OH

Boc—β—Ala—Glu(OtBu)—His—D—Phe—Lys(-Boc)—Phe—OH

Boc—Met—Glu(OtBu)—His—D—Phe—Lys(Boc-)—Phe—OMe

Boc—Met—Glu(OtBu)—His—D—Phe—Lys(Boc-)—Phe—NH$_2$

Boc—Met—Glu(OtBu)—His—D—Phe—Lys(Boc-)—Phe—OC$_{11}$H$_{23}$

Boc—Met—Gln—His—D—Phe—Lys(Boc)—Phe—OH.

8. Removal protecting groups

By treatment of the peptides obtained in (6.) and (7.) with 90% TFA, as described previously, and exchange of the resulting trifluoro acetate for acetate, the acetates are obtained of:

|  | Rf* on SiO$_2$ |
|---|---|
| H-(α-Me)Ala-Glu-D-Phe-Lys-Phe-OH | 0.16 |
| H-Gly-Glu-His-D-Phe-Lys-Phe-OH | 0.14 |
| H-Met-Glu-His-D-Phe-Lys-Phe-OH | 0.17 |
| Dam-Glu-His-D-Phe-Lys-Phe-OH | 0.23 |
| H-β-Ala-Glu-His-D-Phe-Lys-Phe-OH | 0.18 |
| H-Met-Glu-His-D-Phe-Lys-Phe-OMe | 0.26 |
| H-Met-Glu-His-D-Phe-Lys-Phe-NH$_2$ | 0.23 |
| H-Met-Glu-His-D-Phe-Lys-Phe-OC$_{11}$H$_{23}$ | 0.29 |
| H-Met-Gln-His-D-Phe-Lys-Phe-OH | 0.24 |

*Rf in Bu:Py:Ac:Wa (4:3/4:1/4:1).

EXAMPLE IX

A—Glu—His—D—Phe—Lys—Tra

1. H—D—Phe—Lys(Boc)—Tra 3.19 g of Z—D—Phe—Lys(Boc)—Tra obtained from Z—D—Phe—ONP and H—Lys(Boc)—Tra are hydrogenated in methanol as described in example VIII.5.

Rf in Bu:Ac:Wa (4:1:1) = 0.76 on SiO$_2$.

2. Boc—Met—Glu(OtBu)—His—D—Phe—Lys(Boc-)—Tra

Boc—Met—Glu(OtBu)—His—N$_2$H$_3$ (1.5 g) is converted into the azide with 3.84 ml of 2.51 N HCl/THF and 0.44 ml of isoamyl nitrite in the way described previously.

After the addition of 1.36 ml of TAA and 1.48 g of H—D—Phe—Lys(Boc)—Tra, dissolved in 20 ml of DMF and 0.32 ml of TAA, the pH is adjusted to 7.7. After 70 hours stirring at 0° the mixture is filtered and the DMF distilled off in vacuo. The oily residue is taken up in aqueous ethylacetate and washed with water, saliferous water, 0.1 N HCl and again with saliferous water.

After drying, the ethylacetate is evaporated to about 45 ml, yielding a precipitate.

Yield 55%.

3. H—Met—Glu—His—D—Phe—Lys—Tra

One gram of the peptide prepared in (2.) is deprotected in the same way as described in example I.2 and exchanged for acetate.

Yield after lyophilization: 0.6 g.

Rf in Bu:Py:Ac:Wa (2:3/4:1/4:1) = 0.35 on SiO$_2$.

4. Oxidation

Oxidation with hydrogen peroxide in the way described in example II.a and II.b respectively gives the methionine-sulfoxide analogue and the sulfone derivative respectively.

| Sulfoxide derivative | Rf* = 0.27 on SiO$_2$ |
|---|---|
| Sulfone derivative | Rf* = 0.29 on SiO$_2$ |

*Rf in Bu:Py:Ac:Wa (4:3/4:1/4:1).

5.

In the same way as described in (2.) and (3.) the following peptide acetates are obtained:

H—β—Ala—Glu—His—D—Phe—Lys—Tra

Dam—Glu—His—D—Phe—Lys—Tra.

EXAMPLE X

H—Met—Glu—His—D—Phe—Arg—Tra

In the same manner as described in example IX the peptide Boc—Met—Glu(OtBu)—His—N$_2$H$_3$ is converted into the azide and then coupled to H—D—Phe—Arg—Tra, resulting into the protected peptide Boc—Met—Glu(OtBu)—His—D—Phe—Arg—Tra.

The latter peptide is treated with trifluoro acetic acid in the manner as described previously after which the trifluoro acetate salt of the peptide is converted to the acetate.

Rf in Bu:Py:Ac:Wa (4:3/4:1/4:1) = 0.18.

EXAMPLE XI

A—Glu—His—D—Phe—Lys—R (R = aminoalkylamide)

1. Z—D—Phe—Lys(Boc)—PPA

Z—D—Phe—ONP (7.61 g) is added to a solution of 6.39 g of H—Lys(Boc)—PPA, obtained by hydrogenation from the corresponding Z—Lys(Boc)—PPA (melting point 78°–79°C) in 70 ml of DMF.

This light yellow solution is stirred for one night at room temperature, after which the DMF is distilled off in vacuo. The residue is dissolved in ethylacetate and this solution is washed with 5% potassium carbonate solution, water. 0.1 N hydrochloric acid and water. The organic layer is dried, after which the ethylacetate is distilled off and the residue crystallized from warm ethylacetate.

Yield: 11.4 g.

Rf in Ba:EtOH (8:2) = 0.68 on SiO$_2$.

2. H—D—Phe—Lys(Boc)—PPA.HCl

Of the dipeptide amide prepared in 1., 9.07 G are dissolved in 100 ml of purified DMF and 4 ml of 4 N HCl. After the addition of 0.9 g of 10% palladium on charcoal, hydrogen is bubbled through the mixture for 4 hours, after which filtration takes place and the filtrate is evaporated to dryness.

Rf in Bu:Ac:Wa (4:1:1) = 0.60 on SiO₂.

3. Boc—Met—Glu(OtBu)—His—D—Phe—Lys(Boc)—PPA

Boc—Met—Glu(OtBu)—His—N₂H₃ (2.34 g) is converted into the azide in the way described previously (example I.1). Then so much solvent is added to the azide solution that the volume is exactly 40 ml (4 mmol azide-containing solution). To 10 ml of azide solution is added a solution of 1 mmol of the peptide derivative prepared in 2. in 10 ml of DMF, after which the pH is adjusted to 6.9–7.0 with N-ethylmorpholine.

After 70 hours stirring the resulting precipitate is filtered off and the filtrate evaporated to dryness in vacuo. The residue is stirred with water and dried. The resulting peptide derivative is crystallized from warm ethylacetate.

Rf in To:EtOH (8:2) = 0.37 on SiO₂.

4. H—Met—Glu—His—D—Phe—Lys—PPA.acetate

Of the peptide derivative (prepared in 3.) 0.5 g is deprotected in a conventional manner (example I.2.). The trifluoro acetate is converted with Dowex X-8 (acetate) into the corresponding acetate.

Rf in Bu:Py:Ac:Wa (2:3/4:1/4:1) = 0.40 on SiO₂.

5. Oxidation of H—Met—Glu—His—D—Phe—Lys—PPA

In the way described in example II the methionine sulfoxide and sulfone analogues are obtained.

Both products are purified by Craig's counter current distribution, system Bu:Ac:Wa (4:1:1).

| | |
|---|---|
| H-Met( →O)-Glu-His-D-Lys-PPA | Rf* = 0.19 |
| H-Met( →O₂)-Gly-His-D-Phe-Lys-PPA | Rf* = 0.21 |

*Rf on SiO₂ in Bu:Py:Ac:Wa (4:3/4:1/4:1).

6. In an analogous manner are prepared the following acetates:

H—Met—Glu—His—D—Phe—Lys—PEA
H—Met—Glu—His—D—Phe—Lys—Amf
H—(α-Me)Ala—Glu—His—D—Phe—Lys—PEA
H—Val—Glu—His—D—Phe—Lys—PEA
H—Ala—Glu—His—D—Phe—Lys—Amf
Dam—Glu—His—D—Phe—Lys—Amf
Dam( → O)—Glu—His—D—Phe—Lys—Amf
Dam( → O₂)—Glu—His—D—Phe—Lys—Amf
H—Met( → O)—Glu—His—D—Phe—Lys—Amf
H—Met( → O)—Glu—His—D—Phe—Lys—PEA
H—Met( → O₂)—Glu—His—D—Phe—Lys—PEA

EXAMPLE XII

Zinc complexes

Of a solution of zinc chloride, containing 50 mg of zinc per ml, 1.5 ml are added to a solution of 31.5 mg of Na₂HPO₄.2H₂O in 30 ml of distilled water. The precipitate of zinc phosphate formed during this process is dissolved again by adding 4 N HCl. Then 175 mg of NaCl and 0.5 g of benzylalcohol are added to this mixture.

Then 1.5 mg of the required peptide are dissolved in this mixture, after which enough NaOH is added to adjust the pH of the mixture to 8.5. After that the volume is completed with distilled water to 50 ml.

One millilitre of suspension suitable for injection contains:

| | |
|---|---|
| 30 | μg of peptide |
| 1.5 | mg of zinc |
| 0.63 | mg of Na₂HPO₄.2H₂O |
| 3.5 | mg of NaCl |
| 10 | mg of benzylalcohol |

In this way zinc suspensions are prepared of the following peptides:

H—Met—Glu—His—D—Phe—OH
H—β—Ala—Glu—His—D—Phe—OH
H—Met( → O₂)—Glu—His—D—Phe—OH
H—Met—Glu—His—D—Phe—Lys—Phe—OH
H—β—Ala—Glu—His—D—Phe—Lys—Tra.

What is claimed is:

1. A peptide of the formula: A—L—Glu(Q)—L—His—D—X in which L and D indicate the configuration of the relative residue and A is selected from the group consisting of H—L—Met, H—L—Met( → O), H—L—Met ( → O₂), desamino-methionyl, desaminodesamino-methionyl( → O), desamino-methionyl ( → O₂), and the moiety: H₂N—B—CO—, in which B is alkylene having 1–6 carbon atoms;

Q is selected from the group consisting of hydroxy and amino;

X is selected from a (N-phenyl branched alkyl) amino group of the formula

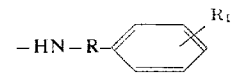

in which R is a branched alkylene group with 2-6 carbon atoms and R₁ is selected from the group consisting of hydrogen and hydroxy; and the group —Phe—Y in which Y is selected from the group consisting of hydroxy, descarboxy-lysyl, descarboxy-arginyl, —L—Lys—Z and —L—Arg—Z, in which Z is selected from the group consisting of hydroxy, —L—Phe—OH, β-indolyl-ethylamino, and a phenylalkylamino moiety of the formula

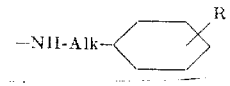

in which Alk is alkylene with 1–6 carbon atoms and R₁ is selected from the group consisting of hydrogen and hydroxy;

and functional derivatives of said peptide selected from the group consisting of pharmaceutically acceptable acid addition salts, derivatives in which one or more free amino groups are substituted by acyl derived from an aliphatic carboxylic acid with 1–6 carbon atoms, unsubstituted amides or lower alkyl (1–6 C) substituted amides of those peptides having a free carboxyl group, esters derived from aliphatic or aralipathic alcohols with 1–18 carbon atoms, and metal complexes thereof.

2. A peptide according to claim 1 of the formula:

in which A, Q and Y have the meanings indicated in claim 1.

3. A peptide according to claim 1 of the formula:

A—L—Glu(Q)—L—His—D—Phe—T—Z, in which A, Q and Z have the meanings indicated in claim 1, and T is selected from L—Lys and L—Arg.

4. A peptide according to claim 1 of the formula:

A—L—Glu(Q)—L—His—D—Phe—T—Phe—OH, in which A and Q have the meanings indicated in claim 1 and T is selected from L—Arg and L—Lys.

5. A peptide according to claim 1 of the formula:

A—L—Glu(Q)—L—His—D—Phe—T—Indolylethylamino in which A and Q have the meanings indicated in claim 1 and T is selected from L—Arg and L—Lys.

6. A peptide according to claim 1 in which A is selected from the group consisting of Met, desaminomethionyl and the corresponding sulfoxides and sulfones thereof.

7. A metal complex of the peptides and peptide derivatives as claimed in claim 1.

* * * * *